US007922589B2

(12) United States Patent
Kuhn et al.

(10) Patent No.: US 7,922,589 B2
(45) Date of Patent: Apr. 12, 2011

(54) ELECTRONIC GAME TABLE WITH MULTIFUNCTION LEGS

(75) Inventors: Tyler V. Kuhn, Spokane, WA (US); David A. Krise, Spokane, WA (US); Eric D. Miesch, Spokane, WA (US)

(73) Assignee: DigiDeal Corporation, Spokane, WA (US)

( * ) Notice: Subject to any disclaimer, the term of this patent is extended or adjusted under 35 U.S.C. 154(b) by 161 days.

(21) Appl. No.: 12/336,672

(22) Filed: Dec. 17, 2008

(65) Prior Publication Data

US 2010/0151953 A1 Jun. 17, 2010

(51) Int. Cl.
*A63F 13/08* (2006.01)
*A63F 13/00* (2006.01)

(52) U.S. Cl. ....... 463/46; 273/309; 273/274; 273/138.2; 463/32; 463/42

(58) Field of Classification Search .................. 273/309, 273/274, 138.1, 138.2; 463/46, 12, 13, 32, 463/42
See application file for complete search history.

(56) References Cited

U.S. PATENT DOCUMENTS 2,519,681 A 8/1950 Mages
3,049,001 A 8/1962 Mackay et al.
3,070,087 A 12/1962 Sittel
3,181,351 A 5/1965 Stauffer
3,796,433 A 3/1974 Fraley et al.
4,072,310 A 2/1978 Beam
4,273,222 A * 6/1981 Cassimally et al. ........ 190/18 A
4,294,451 A 10/1981 Wollner
4,380,334 A 4/1983 Minkoff et al.
4,531,187 A 7/1985 Uhland
4,614,342 A 9/1986 Takashima
4,636,951 A 1/1987 Harlick
4,760,527 A 7/1988 Sidley
4,813,675 A 3/1989 Greenwood
4,926,327 A 5/1990 Sidley
5,022,653 A 6/1991 Suttle et al.
(Continued)

FOREIGN PATENT DOCUMENTS

GB 2117546 A 10/1983
(Continued)

OTHER PUBLICATIONS

U.S. Appl. No. 12/176,248, filed 2009, Kuhn et al.
(Continued)

*Primary Examiner* — Benjamin H Layno
(74) *Attorney, Agent, or Firm* — Mark Farrell Patent Law PC; Mark Farrell

(57) ABSTRACT

Electronic game tables with multifunction legs are described. In one implementation, an electronic multiplayer game table includes a tabletop with player stations for an electronic betting game. Multifunction legs physically support the periphery of the tabletop, while electronic components for playing the betting game are mounted in the multifunction legs. For example, a multifunction leg may contain multiple currency detectors and coinless slot machine-style ticket printers/readers, so that each player at the game table has an exclusive currency detector and an exclusive ticket printer in close proximity. The multifunction legs may also include magnetic or smart card readers for transferring player, banking, and monetary information. In a variation, central control components of the electronic game table are also mounted in the legs. The multifunction legs can eliminate the need for a central support pedestal. This enables efficient under-table cooling schemas and other innovations, such as under-table lighting and a central tabletop holograph space.

14 Claims, 7 Drawing Sheets

U.S. PATENT DOCUMENTS

| | | | | |
|---|---|---|---|---|
| 5,033,744 | A | 7/1991 | Bridgeman et al. | |
| 5,046,736 | A | 9/1991 | Bridgeman et al. | |
| 5,098,107 | A | 3/1992 | Boylan et al. | |
| 5,141,234 | A | 8/1992 | Boylan et al. | |
| 5,224,706 | A | 7/1993 | Bridgeman et al. | |
| 5,242,163 | A | 9/1993 | Fulton | |
| 5,255,915 | A | 10/1993 | Miller | |
| 5,332,219 | A | 7/1994 | Marnell, II et al. | |
| 5,377,973 | A | 1/1995 | Jones | |
| 5,377,993 | A | 1/1995 | Josephs | |
| 5,393,057 | A | 2/1995 | Marnell, II | |
| 5,407,199 | A | 4/1995 | Gumina | |
| 5,423,551 | A | 6/1995 | Stavinsky | |
| 5,496,032 | A | 3/1996 | Okada | |
| 5,511,781 | A | 4/1996 | Wood et al. | |
| 5,531,440 | A | 7/1996 | Dabrowski et al. | |
| 5,531,448 | A | 7/1996 | Moody | |
| 5,586,766 | A | 12/1996 | Forte et al. | |
| 5,586,936 | A | 12/1996 | Bennett et al. | |
| 5,613,912 | A | 3/1997 | Slater | |
| 5,630,586 | A | 5/1997 | Lowden | |
| 5,636,843 | A | 6/1997 | Roberts | |
| 5,651,548 | A | 7/1997 | French et al. | |
| 5,655,966 | A | 8/1997 | Werdin | |
| 5,669,817 | A | 9/1997 | Tarantino | |
| 5,674,128 | A | 10/1997 | Holch et al. | |
| 5,687,968 | A | 11/1997 | Tarantino | |
| 5,735,742 | A | 4/1998 | French | |
| 5,743,800 | A | 4/1998 | Huard et al. | |
| 5,766,076 | A | 6/1998 | Pease et al. | |
| 5,770,533 | A | 6/1998 | Franchi | |
| 5,779,546 | A | 7/1998 | Meissner et al. | |
| 5,788,230 | A | 8/1998 | Krise et al. | |
| 5,788,574 | A | 8/1998 | Ornstein et al. | |
| 5,803,808 | A | 9/1998 | Strisower | |
| 5,831,527 | A | 11/1998 | Jones, II et al. | |
| 5,839,960 | A | 11/1998 | Parra et al. | |
| 5,845,907 | A | 12/1998 | Wells | |
| 5,868,392 | A | 2/1999 | Kraft | |
| 5,879,233 | A | 3/1999 | Stupero | |
| 5,909,876 | A | 6/1999 | Brown | |
| 5,919,090 | A | 7/1999 | Mothwurf | |
| 5,934,998 | A | 8/1999 | Forte et al. | |
| 5,944,315 | A | 8/1999 | Mostashari | |
| 5,944,316 | A | 8/1999 | Hernandez | |
| 5,951,397 | A | 9/1999 | Dickinson | |
| 6,010,404 | A | 1/2000 | Walker et al. | |
| 6,093,101 | A | 7/2000 | Mourad | |
| 6,099,408 | A | 8/2000 | Schneider et al. | |
| 6,158,741 | A | 12/2000 | Koelling | |
| 6,165,069 | A | 12/2000 | Sines et al. | |
| 6,186,895 | B1 | 2/2001 | Oliver | |
| 6,200,218 | B1 | 3/2001 | Lindsay | |
| 6,203,008 | B1 | 3/2001 | Krise et al. | |
| 6,203,009 | B1 | 3/2001 | Sines et al. | |
| 6,217,447 | B1 | 4/2001 | Lofink et al. | |
| 6,270,404 | B2 | 8/2001 | Sines et al. | |
| 6,419,225 | B2 | 7/2002 | Sines et al. | |
| 6,419,226 | B2 | 7/2002 | Krise et al. | |
| 6,481,718 | B2 | 11/2002 | Koelling et al. | |
| 6,619,659 | B2 | 9/2003 | Krise et al. | |
| 6,641,137 | B2 | 11/2003 | Sines et al. | |
| 6,651,985 | B2 | 11/2003 | Sines et al. | |
| 6,722,974 | B2 | 4/2004 | Sines et al. | |
| 6,896,259 | B2 | 5/2005 | Sines et al. | |
| RE38,982 | E | 2/2006 | Forte et al. | |
| 7,048,629 | B2 | 5/2006 | Sines et al. | |
| 7,255,642 | B2 | 8/2007 | Sines et al. | |
| 2002/0146271 | A1* | 10/2002 | Luciano et al. | 400/693 |
| 2005/0020360 | A1* | 1/2005 | Hosaka | 463/31 |
| 2006/0003828 | A1* | 1/2006 | Abecassis | 463/16 |

FOREIGN PATENT DOCUMENTS

WO WO 2006078219 A1 * 7/2006

OTHER PUBLICATIONS

U.S. Appl. No. 12/192,751, filed 2008, Kuhn et al.
U.S. Appl. No. 12/268,398, filed 2008, Chatellier et al.
U.S. Appl. No. 12/248,891, filed 2008, Kuhn et al.
U.S. Appl. No. 12/323,478, filed 2008, Kuhn et al.
U.S. Appl. No. 12/260,989, filed 2008, Kuhn et al.
U.S. Appl. No. 12/251,875, filed 2008, Krise et al.
U.S. Appl. No. 12/269,029, filed 2008, Kuhn et al.
U.S. Appl. No. 12/336,672, filed 2008, Kuhn et al.
U.S. Appl. No. 11/396,005, filed 2006, Sines et al.
U.S. Appl. No. 11/397,155, filed 2006, Sines et al.
U.S. Appl. No. 11/404,955, filed 2006, Sines et al.
U.S. Appl. No. 11/404,952, filed 2007, Kuhn et al.
U.S. Appl. No. 11/505,748, filed 2008, Kuhn et al.
U.S. Appl. No. 11/100,795, filed 2006, Sines et al.
U.S. Appl. No. 11/591,144, filed 2007, Kuhn et al.
U.S. Appl. No. 11/590,954, filed 2007, Kuhn et al.
U.S. Appl. No. 11/591,145, filed 2007, Kuhn et al.
U.S. Appl. No. 11/591,072, filed 2006, Kuhn et al.
U.S. Appl. No. 11/642,404, filed 2006, Kuhn et al.
U.S. Appl. No. 11/642,580, filed 2006, Kuhn et al.
U.S. Appl. No. 12/072,020, filed 2008, Kuhn et al.
U.S. Appl. No. 12/077,074, filed 2008, Sines et al.
U.S. Appl. No. 12/072,028, filed 2008, Sines et al.
U.S. Appl. No. 12/077,078, filed 2008, Sines et al.
U.S. Appl. No. 12/077,080, filed 2008, Sines et al.
U.S. Appl. No. 10/858,160, filed 2005, Sines et al.
U.S. Appl. No. 11/055,589, filed 2005, Sines et al.
U.S. Appl. No. 12/176,248, filed 2008, Kuhn et al.
U.S. Appl. No. 12/192,751, filed 2008, Kuhn et al.
U.S. Appl. No. 12/248,891, filed 2008, Kuhn et al.
U.S. Appl. No. 12/251,875, filed 2008, Krise et al.
U.S. Appl. No. 12/260,989, filed 2008, Kuhn et al.
U.S. Appl. No. 12/268,398, filed 2008, Chatellier, et al.
U.S. Appl. No. 12/269,029, filed 2008, Kuhn et al.
U.S. Appl. No. 12,323,478, filed 2008, Kuhn et al.

* cited by examiner

BOTTOM VIEW

ELECTRONIC GAME TABLE WITH MULTIFUNCTION LEGS

BACKGROUND

Electronic game tables for multiplayer betting games conventionally have a tabletop attached to a central support pedestal that also houses central control components, such as a computing device that acts as a server for peripheral player stations. Or, such conventional electronic game tables have peripheral legs that serve the sole function of supporting the tabletop. With either of these tabletop support schemas, there is limited tabletop area for each player. While it is common to provide each player at an electronic game table with a dedicated touch screen display, it is difficult or impossible to provide each player with other accessories, such as a paper currency detector or a cash-out ticket printer.

What is needed is a way to place more of the desirable components of an electronic game table in close proximity to each player, without cluttering the tabletop to the point of creating distraction or impairing usefulness.

SUMMARY

Electronic game tables with multifunction legs are described. In one implementation, an electronic multiplayer game table includes a tabletop with player stations for an electronic betting game. Multifunction legs physically support the periphery of the tabletop, while electronic components for playing the betting game are mounted in the multifunction legs. For example, a multifunction leg may contain multiple currency detectors and coinless slot machine-style ticket printers/readers, so that each player at the game table has an exclusive currency detector and an exclusive ticket printer in close proximity. The multifunction legs may also include magnetic or smart card readers for transferring player, banking, and monetary information. In a variation, central control components of the electronic game table are also mounted in the legs. The multifunction legs can eliminate the need for a central support pedestal. This enables efficient under-table cooling schemas and other innovations, such as under-table lighting and a central tabletop holograph space.

This summary section is not intended to give a full description of electronic game tables with multifunction legs, or to provide a list of features and elements. A detailed description of example embodiments of such an electronic gaming system follows.

DETAILED DESCRIPTION

Overview

This disclosure describes electronic game tables with multifunction legs. The multifunction legs provide many benefits over conventional electronic game tables.

Exemplary Apparatus

Figure 1:
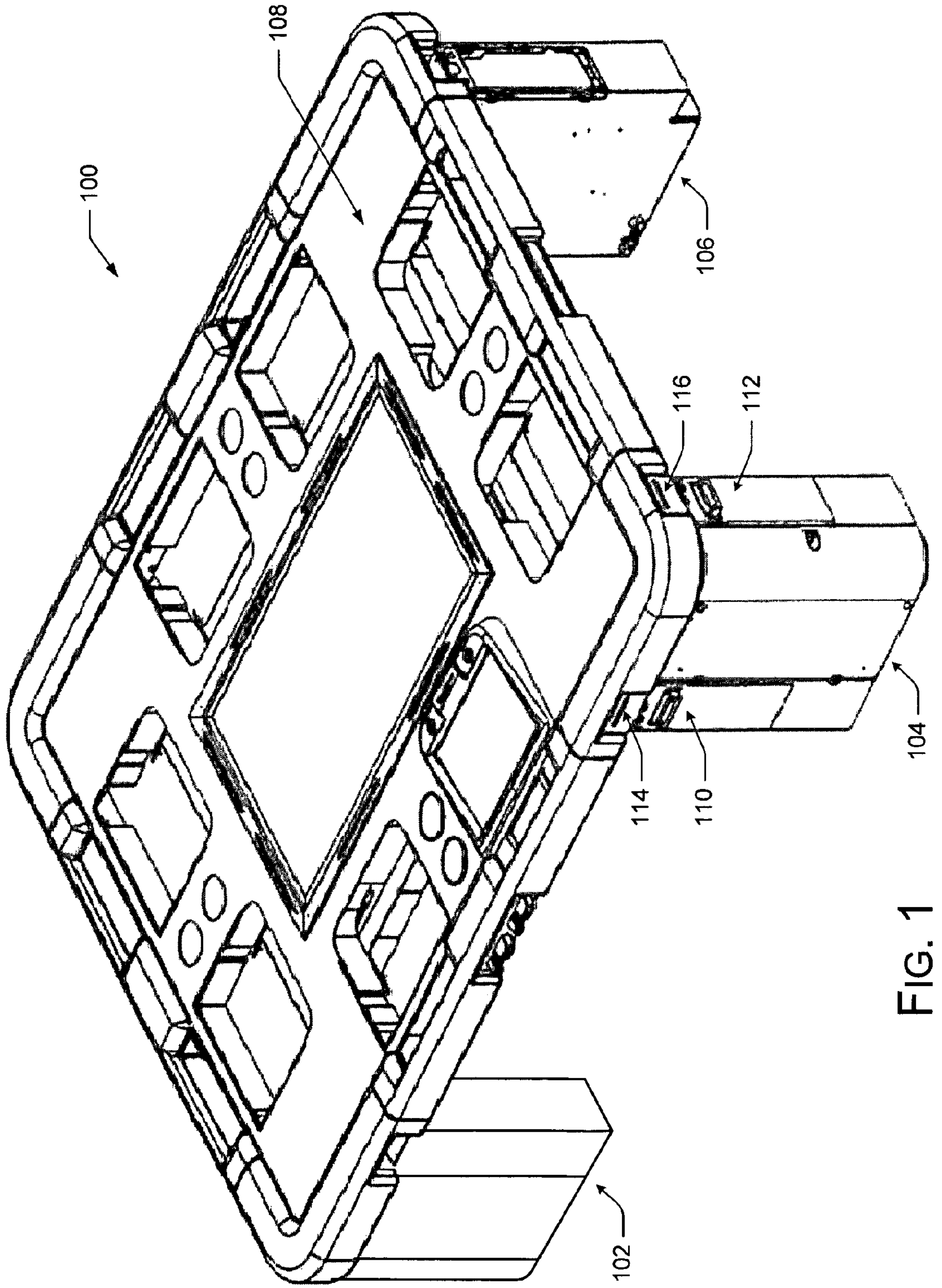
FIG. 1 is an elevation diagram of an electronic game table under construction with exemplary multifunction legs.

In one implementation, as shown in FIG. 1, an exemplary electronic game table 100 for betting games has multifunction legs, e.g., 102, 104, & 106 attached around the outer perimeter or periphery of a tabletop 108. For example, each leg may be attached at a different outer corner of the tabletop 108. Each leg, e.g., leg 104, contains a vertical support member for supporting the tabletop 108 as well as electronic equipment, e.g., communicatively coupled with central control components to provide some elements of a distributed network.

Besides physically supporting the electronic game tabletop 108 either directly via the vertical support member or indirectly via horizontal rails between the vertical support members of two legs, each multifunction leg 104 serves additional practical functions, such as housing currency detectors 110 & 112 and ticket printers 114 & 116 associated with the electronic betting game. The ticket printers 114 & 116, which can be tickets-in-tickets-out systems, typically create a paper ticket with a barcode representing the player's credit balance or money balance (money balance is used herein to represent either) at the time of cashing-out from the electronic game table 100. Depending on implementation, the same device or a different ticket reader may scan the ticket to input a player's money balance as credits at the electronic game table 100. Currency detectors 110 & 112, which are also known as bill validators, bill acceptors, paper currency readers, and sometimes ticket readers, scan paper currency and/or tickets created by ticket printers 114 & 116 using optical sensors. Upon validation, the currency detector 112 signals the control components of the electronic game table 100 of a player credit via a parallel or serial interface.

Other components, such as power supplies and cooling devices, may also be housed in each multifunction leg 104. The multifunction legs may also include magnetic or smart card readers for transferring player, banking, and monetary information to and from an internal or external system for using and tracking the information. A smart card (chip card, or integrated circuit card) is a pocket-sized card with embedded electronics to process data. The exemplary multifunction legs 104 contrast with conventional gaming tables that group the significant conventional electronic components into a central support pedestal of the conventional table or in the tabletop.

The exemplary multifunction legs 104 provide many advantages for the exemplary electronic game table 100 over conventional electronic game table layouts. In one implementation, besides supporting the tabletop 108, each multifunction leg 104 provides currency detectors 110 & 112 and ticket printers 114 & 116 for two players, one on each side of a given multifunction leg 104. Thus, a game table 100 with four legs provides each of eight players with an exclusive currency reader 110 and an exclusive ticket printer 116 for that player alone. Such multifunction legs 104 provide each player at the game table 100 with an exclusive currency reader 110 and an exclusive ticket printer 116 without adding bulk to the game tabletop 108 or to a central pedestal of the game table 100.

The multifunction legs 104 position a user interface for each of the user-accessible electronic components mounted in the legs within close proximity to the adjacent player position and thereby within easy reach of a player seated adjacent to a leg. Thus, each player does not have to reach very far to use a respective currency reader 110 and ticket printer 116 dedicated exclusively to that player.

Housing significant electronic components in the multifunction legs 104 keeps electronic accessories from bulking up a central pedestal—or from requiring a central pedestal at all—and from cluttering the game tabletop 108 with credit processing devices and related user interfaces. The multifunction legs 104 allow the electronic game table 100 to achieve a leaner appearance and cleaner tabletop 108 than conventional electronic game tables, while providing another practical benefit of more leg room. The central housing for central control components can be suspended from the bottom of the tabletop 108, or from horizontal supports attached between the multifunction legs 104 that support the tabletop 108, instead of relying on the support of a central pedestal.

Figure 2:
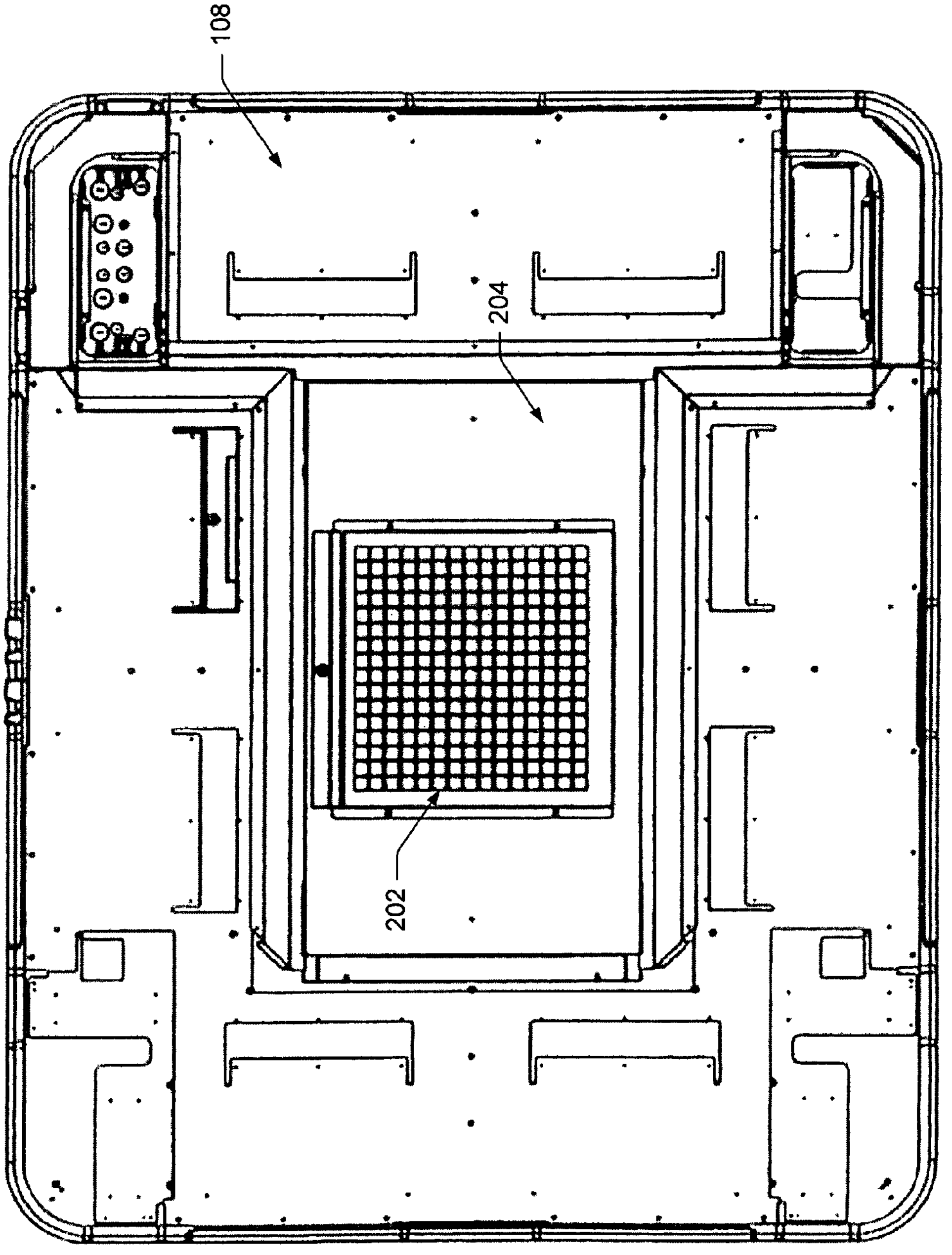
FIG. 2 is a bottom view of the electronic game table shown in FIG. 1.

As shown in FIG. 2, the multifunction legs 104 allow an innovative cooling system for electronic game tables, in which a cooling air intake 202 draws air from the open bottom of the central housing 204 (when a central housing 204 is used for central control components) and flows the air through channels in the tabletop 108, or out of a top opening. The central housing 204 can include a relatively large opening 202 at its bottom for air intake, since the multifunction legs 104 eliminate the need for a central pedestal that would conventionally reach to the floor to support the game tabletop 108. Drawing air from the open bottom 202 of the central housing 204 can provide a quieter electronic game table 100. That is, the bottom-located opening 202 enables a quieter placement of electric cooling fans. In another implementation, no cooling fans are needed in the central housing 204. When centrally located electronic components generate heat, the rising heat initiates a spontaneous "thermal siphon" airflow that draws air from the bottom opening(s) 202 of the central housing 204.

In one implementation, either fan-driven air circulation or the spontaneous airflow enabled by the multifunction legs 104 flows through the tabletop 108, which contains airflow channels in an interior layer, and is vented at the edges of the tabletop 108, for example, at points furthest away from any player, or at vents in the multifunction legs 104. Such channels in a tabletop 108 of a game table 100 are described in U.S. patent application Ser. No. 12/260,989 to Kuhn, which is incorporated herein by reference.

Figure 3:
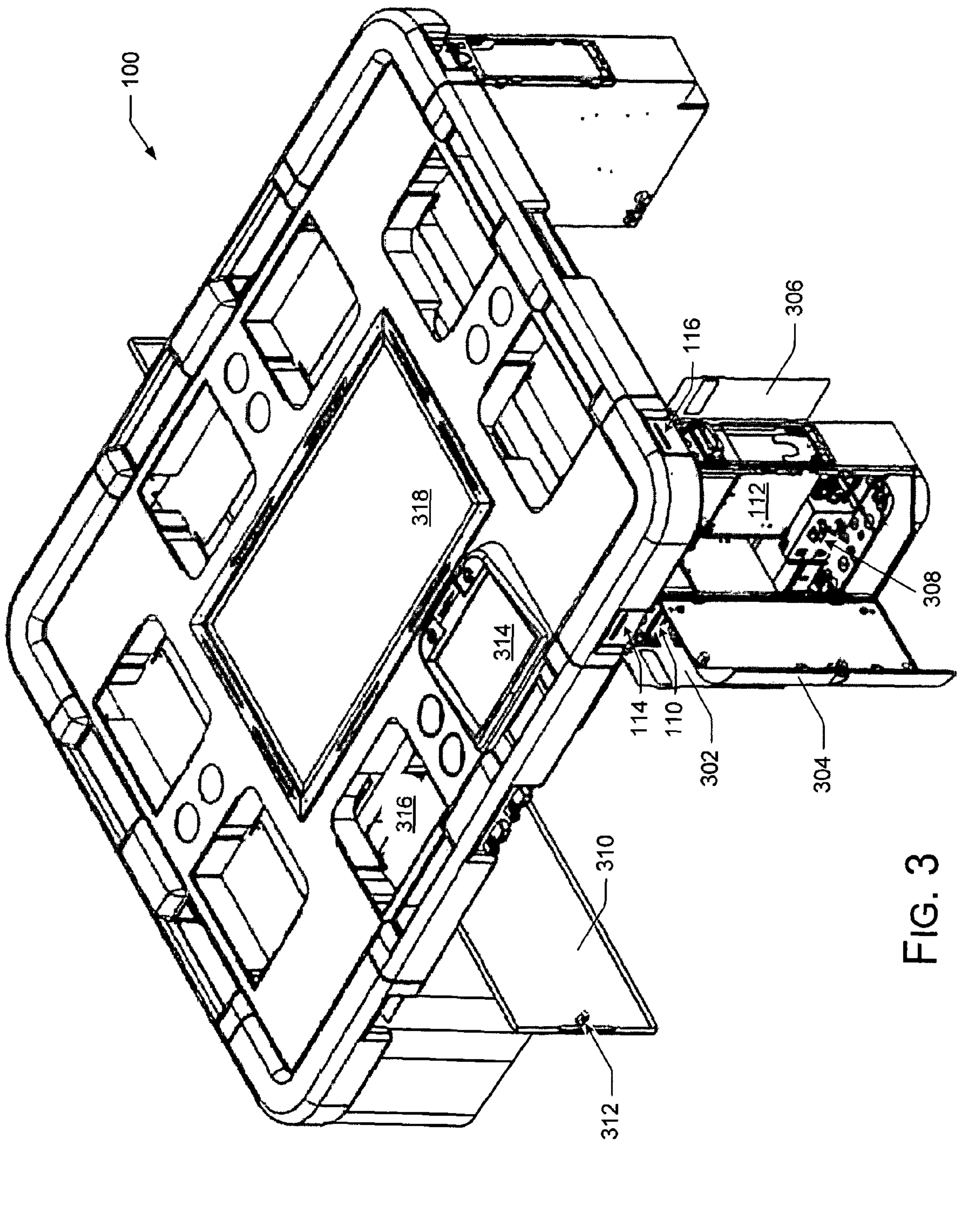
FIG. 3 is an elevation diagram of exemplary construction details of the electronic game table and multifunction legs as shown in FIG. 1.

FIG. 3 shows construction detail of an exemplary implementation of the multifunction legs 104. In the illustrated example, besides providing a vertical support member, the multifunction legs 104 are constructed with various access panels and doors, e.g., 302, 304, and 306, which provide openings for the electronic components 110, 112, 114, 116 housed in the multifunction legs 104 to slide in and out for installation and service. The access doors, e.g., door 304, also allows access to auxiliary components, such as a local power supply 308, local cooling fans if needed (not shown), and support components in the multifunction legs 104, such as support fasteners, retractable "pop-down" transport wheels, leveling mechanisms, and so forth.

A central housing access door 310 typically includes a lock 312 and one or more electric interlocks, to secure the central control components (not shown) and to secure privileged access to game settings.

Alternative Implementations and Variations

In one implementation, since the multifunction legs 104 allow an open space under the central housing 204 (when used), or eliminate the need for a central housing altogether, the tabletop 108 is equipped with underside lighting (not shown) to illuminate the entire floor surface under the electronic game table 100. The underside lighting of the entire floor surface under the game table 100 is not possible with conventional pedestal-style game tables. The underside lighting can be colored to attract attention to the game table, or can change color or flash colors to signal game states, such as wins. The underside lighting can also turn on-and-off on a programmed cue, flash, change color, change intensity, display light movement in a patterned or sequential manner, etc., for example, when a player approaches the table or begins to leave.

In an alternative implementation, all the significant electronic components for the electronic game table 100 (except tabletop player stations, such as player station 314) are mounted in the multifunction legs 104. This eliminates the need for a central housing 204 underneath the tabletop 108. In one variation, when electronic components are distributed to the peripherally attached multifunction legs 104, a central display screen, also known as a common display 318, may sometimes be omitted from the game table 100. This leaves an open space to the floor, or an opening for a 3-D object, such as a sculpture or an advertisement, or an opening for a recessed holographic projection space, i.e., a recessed well in which 3-D holographic shapes may be projected and animated. Such a central space may also be used for other game parts and functions, such as a real or holographic roulette wheel, a real or holographic dice pit, or other centrally positioned gaming device.

Example Method

Figure 4:
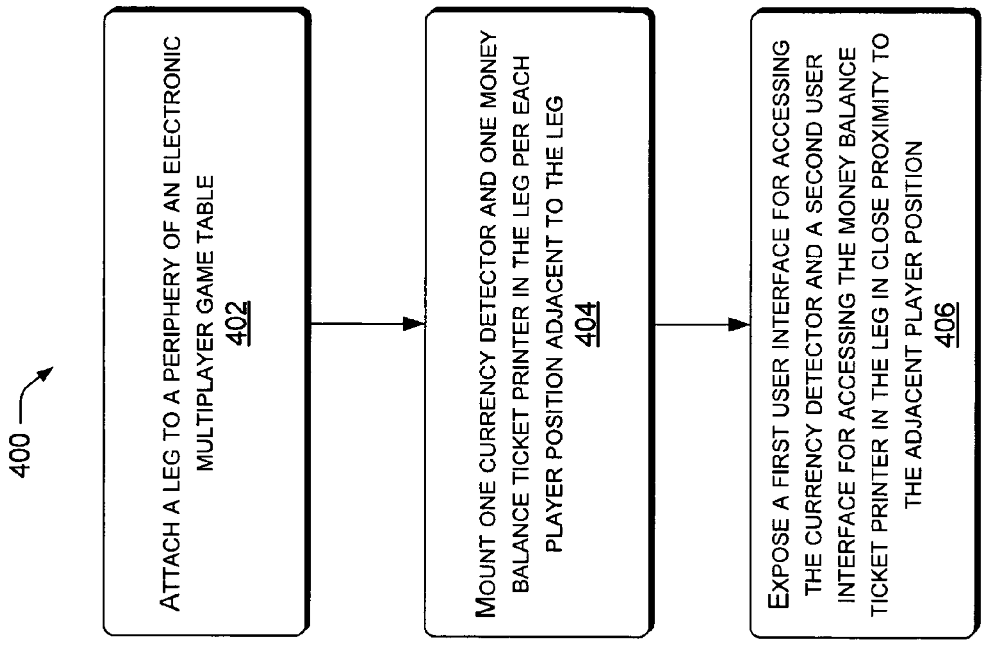
FIG. 4 is a flow diagram of an exemplary method of including electronic components in a leg of an electronic game table.

FIG. 4 shows an exemplary method 400 of including electronic components in a leg of an electronic game table. The operations are represented as individual blocks.

At block 402, a leg is attached to a periphery of an electronic multiplayer game table.

At block 404, one currency detector and one ticket printer and/or reader are mounted in the leg per each player position adjacent to the leg.

At block 406, a first user interface for accessing the currency detector and a second user interface for accessing the ticket printer/reader are mounted in the leg, e.g., within human reach of the adjacent player position.

The currency detectors and the ticket printers/readers are typically communicatively coupled with central control components for executing a betting game on the electronic multiplayer game table.

Multiple legs of the electronic multiplayer game table provide an exclusive currency detector and an exclusive ticket printer/reader for each player position at the electronic multiplayer game table.

Exemplary Game Table Components

The exemplary multifunction legs 104 can be used with electronic game tables and/or tabletops for betting games, such as those game tables, tabletops, and betting games variously described in US. Pat. No. 5,586,766 and U.S. Pat. No. 5,934,998 to Forte et al.; and U.S. Pat. No. 6,165,069, U.S. Pat. No. 7,048,629, and U.S. Pat. No. 7,255,642 to Sines et al., each of which are incorporated herein by reference.

Returning to FIG. 3 as an exemplary implementation of an electronic game table 100 that uses the multifunction legs 104, each game table 100 has an arbitrary size that in the illustrated version seats eight participants. Other implementations can seat a different number of participants. The game table 100 has a display screen or touch screen user interface for each participant, i.e., a player station 314. A participant's player station 314 may include an electronic display for presenting visual images and may further consist of a touch screen display for further interactive capability. Depending upon implementation, each participant player station 314 may also include various other forms of interactive interface, such as pointing devices, light sensors, wagering chip sensors, audio speakers, etc.

The illustrated example game table 100 may also include at least one common display 318 in the center of the game table 100, for presenting visual information to all participants. The common display(s) 318 may present general information redundantly in two, four, or more visual orientations so that the displayed information is oriented correctly for each participant.

The example electronic game table 100 of FIG. 3 has an example layout that is useful for unhosted card games, although using a live dealer at such a game table 100 is not ruled out. The example game table 100 as shown typically uses virtual playing cards and virtual chips. However, the game table 100 can be configured to use any combination of real playing cards, virtual playing cards, real wagering chips, and/or virtual gaming chips. When real playing cards are used, a live shoe that reads the identity of each card sends the card identity information to the electronic processor (504 or 604 in FIGS. 5-7) that runs the game. When real wagering chips are used, light sensors, optical sensors, scanning technology, weigh cells, RFID technology, etc., may be used with specially constructed chips or conventional standard chips to sense chip presence and chip values.

Figure 5:
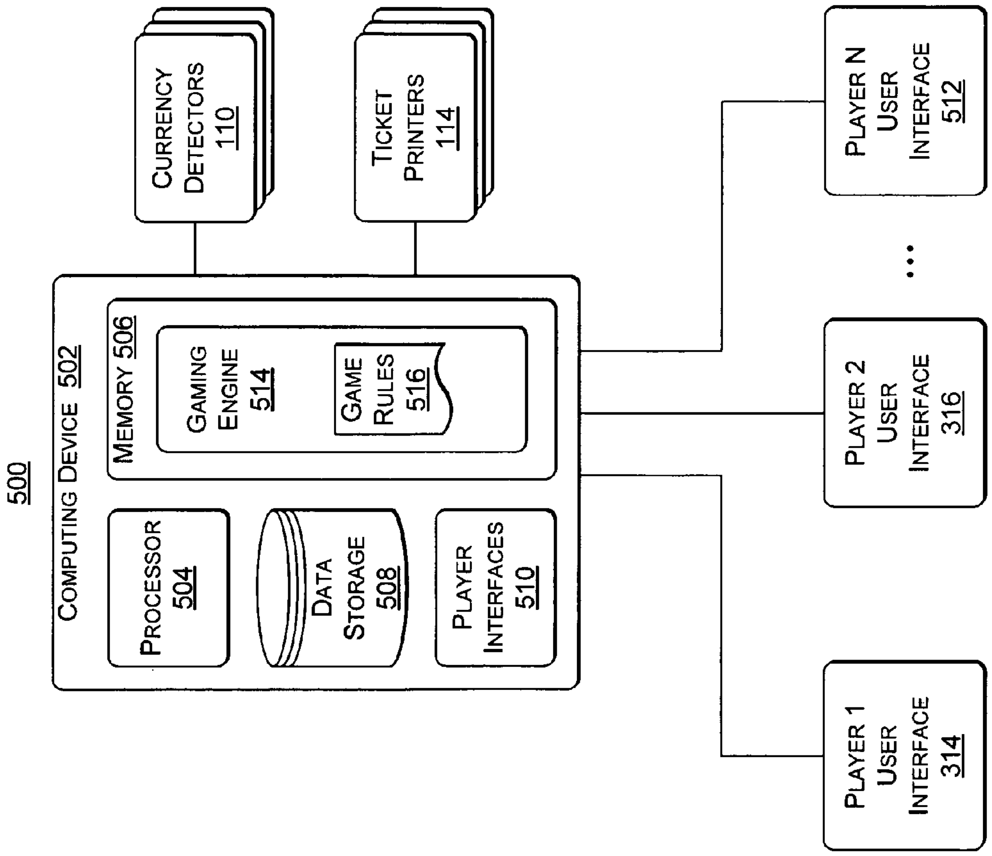
FIG. 5 is a block diagram of a first exemplary game processing system that can be included in game tables that use the multifunction legs.

FIG. 5 shows an example game processing system 500 that can be included in game tables that use the multifunction legs 104, such as electronic game table 100. Some or all of such a game processing system 500, such as currency detectors 110 and ticket printers 114, can be situated in the multifunction legs 104. The illustrated configuration of the exemplary game processing system 500 is meant to provide only one example arrangement for the sake of overview. Many other arrangements of the illustrated components, or similar components, are possible within the scope of the subject matter. Such an exemplary game processing system 500 can be executed in hardware, or combinations of hardware, software, firmware, etc.

The exemplary game processing system 500 includes a computing device 502, which may be a desktop, server, or notebook style computer, or other device that has processor, memory, and data storage. The computing device 502 thus includes a processor 504, memory 506, data storage 508; and interface(s) 510 to communicatively couple with the participant "1" user interface 314, the participant "2" user interface 316, . . . , and the participant "N" user interface 512. The game processing system 500 includes a gaming engine 514 and game rules 516, shown as software loaded into memory 506.

The interfaces 510 can be one or more hardware components that drive the visual displays and communicate with the interactive components, e.g., touch screen displays, of the multiple participant user interfaces 314, 316, . . . , 512.

Figure 6:
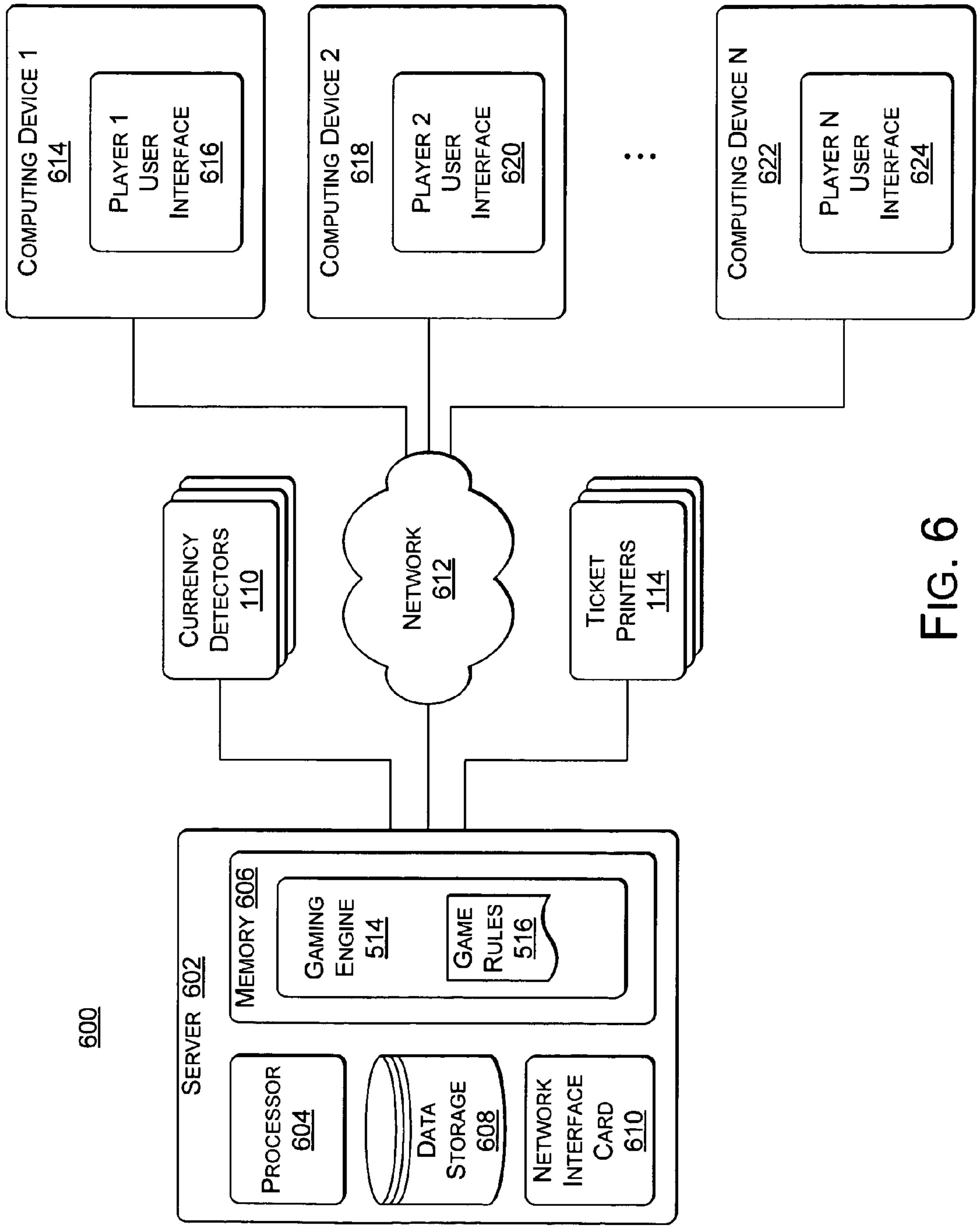
FIG. 6 is a block diagram of a second exemplary game processing system that can be included in game tables that use the multifunction legs.

FIG. 6 shows another example game processing system 600 that can be included in game tables that use the multifunction legs 104, such as electronic game table 100. Some or all of the game processing system 600, such as currency detectors 110 and ticket printers 114, can be situated in one or more of the multifunction legs 104. The illustrated configuration of the exemplary game processing system 600 is meant to provide only one example arrangement for the sake of overview. Many other arrangements of the illustrated components, or similar components, are possible within the scope of the subject matter, e.g., that shown in FIG. 5. In FIG. 6, such an exemplary game processing system 600 can be executed in hardware, or combinations of hardware, software, firmware, etc.

The exemplary game processing system 600 includes a server computing device 602, which can be a computer or other device that has processor, memory, and data storage. The server computing device 602 thus includes a processor 604, memory 606, data storage 608, and an interface, such as a network interface card (NIC) 610, to communicatively couple over a network 612 with remote computing devices, such as computing device "1" 614 that hosts the participant "1" user interface 616; computing device "2" 618 that hosts the participant "2" user interface 620; . . . ; and computing device "N" 622 that hosts the participant "N" user interface 624. The currency detectors 110 and ticket printers 114 typically interface with the server computing device 602 via serial or parallel ports. The game processing system 600 includes a gaming engine 514 and game rules 516, shown as software loaded into memory 606.

The participant computing devices 614, 618, and 622 may be desktop or notebook computers, or may be workstations or other client computing devices that have processor and memory, but may or may not have onboard data storage. Typically, a player station does not have data storage. Such modules may be "dumb" in that they have no bootable device, but generally receive images and instructions from the server 602. Thus, in one implementation, a player computing device 614 is a visual display with graphics processing power and user interface components.

Figure 7:
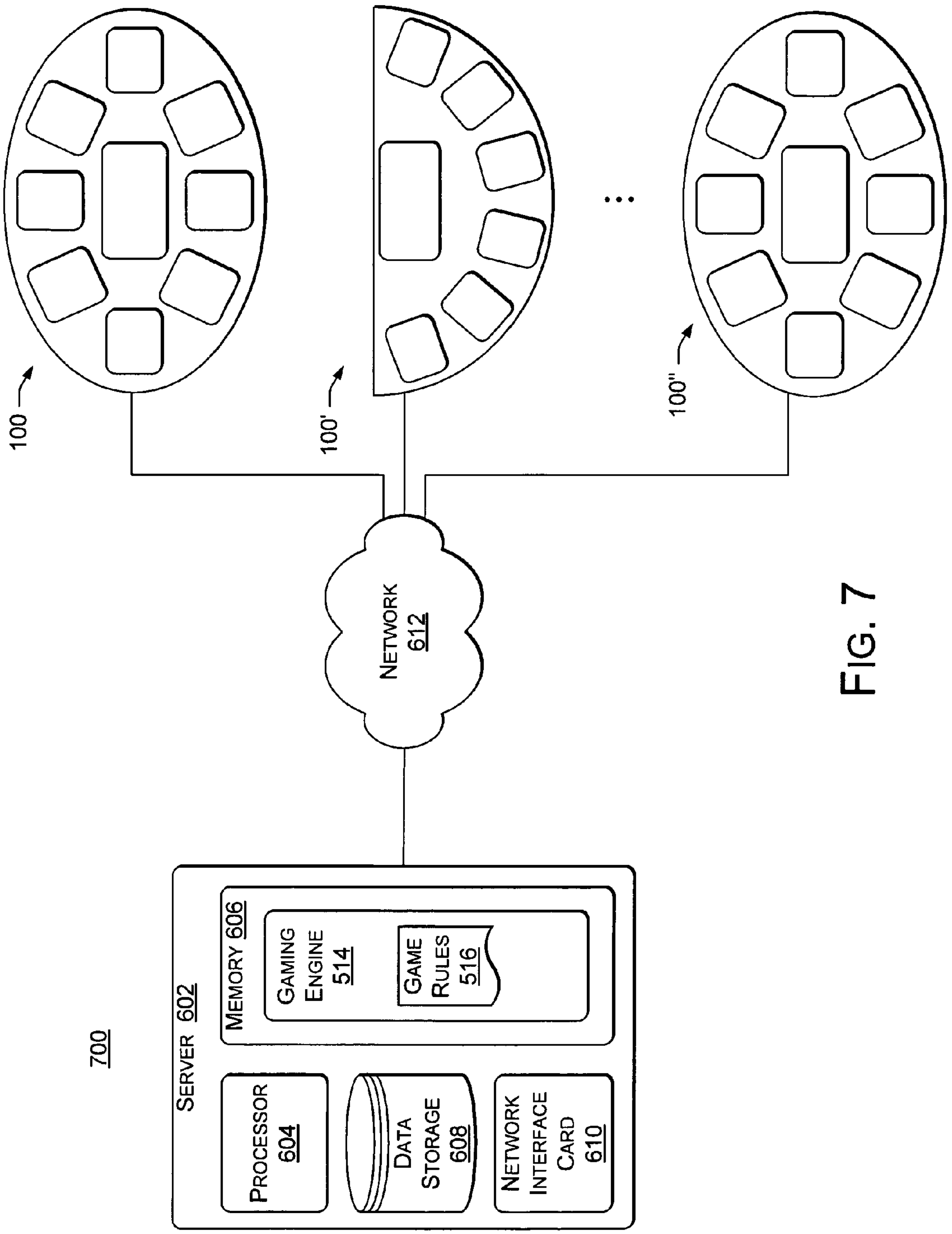
FIG. 7 is a block diagram of a third exemplary game processing system, components of which can be included in game tables that use the multifunction legs.

FIG. 7 shows another example game processing system 700, consisting of a network of gaming machines 100, 100', and 100" that each may have "n" players. Electronic components for each game table may be stored in multifunction legs 104 of the individual game table. The game processing system 700 is similar to that shown in FIG. 6, except that the client nodes of the network 612 are multiplayer gaming machines (e.g., 100, 100', & 100") instead of individual gaming stations. That is, each node of the network 612 can accommodate multiple players. In another implementation, the network 612 has a mixture of client nodes consisting of individual playing stations as in FIG. 6 and multiplayer gaming stations as in FIG. 7.

Conclusion

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. An electronic multiplayer game table, comprising:

a tabletop having four sides, including player stations for multiple players of a multi-player electronic betting game, each of the four sides of the tabletop accommodating at least two seated players of the multiple players;

four legs for supporting the tabletop, wherein the legs are attached to the tabletop at each corner of an outside perimeter of the tabletop, wherein two players are adjacent each leg; and wherein at least some of the electronic components for playing the electronic betting game, including processing a player money balance, are mounted in each of the legs; and wherein the electronic components in each leg include at least one currency detector and one ticket printer for each player position adjacent to the leg.

2. The electronic multiplayer game table as recited in claim 1, wherein each leg includes at least one user interface for accessing the electronic components mounted in the leg; and wherein the user interface is mounted within a human reach distance when a player is seated adjacent to the leg.

3. The electronic multiplayer game table as recited in claim 1, wherein the electronic components mounted in each leg are communicatively coupled with central control components to form elements of a distributed computing device network.

4. The electronic multiplayer game table as recited in claim 1, wherein substantially all of the central control components are also mounted in at least one of the legs mounted to the tabletop near an outside periphery of the tabletop.

5. The electronic multiplayer game table as recited in 1, wherein the electronic components in each leg include at least one currency detector and one ticket printer for each player position adjacent to the leg.

6. The electronic multiplayer game table as recited in 1, wherein the collective electronic components mounted in all of the legs include at least an exclusive currency detector and an exclusive ticket printer for each player position at the electronic multiplayer game table.

7. The electronic multiplayer game table as recited in claim 1, wherein the electronic multiplayer game table includes:

n legs;

2(n) player stations;

two currency detectors and two ticket printers mounted in each leg; and wherein each player station has an associated exclusive currency detector and an associated exclusive ticket printer in a leg adjacent to the player station.

8. The electronic multiplayer game table as recited in claim 7, wherein N equals one of 3, 4, 5, or 6.

9. The electronic multiplayer game table as recited in claim 1, wherein each leg includes one of a power supply, a cooling fan, a card reader, a smart card reader, or a player-identity-card reader.

10. The electronic multiplayer game table as recited in claim 1, wherein the legs support the tabletop; and wherein a central housing for containing control components is suspended from a center part of the tabletop or from a tabletop support member, leaving an open space between the bottom of the central housing and a floor level at the bottom of the legs.

11. The electronic multiplayer game table as recited in claim 10, wherein a bottom surface of the central housing includes an opening for air to cool the control components.

12. The electronic multiplayer game table as recited in claim 11, wherein air is drawn into the central housing by one of an electric cooling fan or by a thermal siphon of heated air rising from the control components.

13. The electronic multiplayer game table as recited in claim 10, wherein an underside light is mounted on at least one of the underside of the tabletop and/or on the bottom surface of the central housing, in order to light an entire floor or ground area under the electronic multiplayer game table.

14. The electronic multiplayer game table as recited in claim 1, wherein substantially all of the central control components are mounted in the legs; and a central area of the tabletop comprises a holographic projection space.

* * * * *